United States Patent [19]
Oakes

[11] 3,713,791
[45] Jan. 30, 1973

[54] SLIPPER BEARING
[76] Inventor: Grant A. Oakes, R.D. No. 4, Cortland, Ohio 44410
[22] Filed: Dec. 28, 1970
[21] Appl. No.: 101,977

Related U.S. Application Data
[63] Continuation-in-part of Ser. No. 792,008, Jan. 17, 1969, Pat. No. 3,589,875.

[52] U.S. Cl. ................................29/196.3
[51] Int. Cl. ................................B23p 3/00
[58] Field of Search ..........................29/196.3, 197

[56] References Cited
UNITED STATES PATENTS 2,191,460  2/1940  Fisher ..........................29/196.5 X
2,977,673  4/1961  Weinman ........................29/196.3

Primary Examiner—Hyland Bizot
Assistant Examiner—J. E. Legru
Attorney—Webster B. Harpman

[57] ABSTRACT

A slipper bearing such as used in a coupling in a drive line of a blooming mill comprises a replaceable bearing forming part of the coupling. The slipper bearing disclosed is of conventional size and shape and is a composite structure having a cast ferrous metal core and softer bronze alloy wearing surfaces. The soft shell construction uses the harder ferrous metal core usually cast steel for its ability to resist breakage and for maintaining the shape and insuring the positioning of the slipper bearing in the coupling of the drive line of the blooming mill while the softer bronze alloy metal forming the wearing surfaces contributes to an unusually long trouble free life.

4 Claims, 4 Drawing Figures

PATENTED JAN 30 1973

3,713,791

INVENTOR.
Grant A. Oakes.
BY
W. B. Harpman
ATTORNEY 3,713,791

SLIPPER BEARING

This is a continuation-in-part of application Ser. No. 792,008 filed Jan. 17, 1969, now U.S. Pat. No. 3,589,875 issued June 29, 1971.

BACKGROUND OF THE INVENTION

1. Field of the Invention:

This invention relates to blooming mills as used in the steel industry for reducing steel ingots to slabs and billets suitable for further reduction and shaping in rolling mills and specifically to an improved slipper bearing forming a part of the universal coupling connecting the movable roll or rolls of a blooming mill with its drive means.

2. Description of the Prior Art:

Slipper bearings heretofore known in the art have consisted of cast and machined shapes suitable for appropriate location in the universal couplings of the drive lines of the blooming mills and have been integrally formed of hard metal usually aluminum bronze or magnesium bronze alloys. The particular composition of the slipper bearing has been heretofore believed to be necessary in view of the extreme mechanical shock and high tensions the slipper bearing is subjected to as the coupling changes position following the vertical motion of the movable roll or rolls of the blooming mill during the blooming operation.

Blooming mills reduce relatively large cross sectionally square or rectangular billets to blooms of substantially half the thickness of the billet. Blooming mills are generally of the reversing type so that the ingot being reduced is moved back and forth in a series of passes with a reduction occurring on each pass so that it is necessary to readjust and reset the blooming mill rolls in order that the reduction continue. The couplings in the drive line are therefore necessary to accommodate such movement and the rotative action of the coupling combined with the thrust, shock and tension attendant the blooming mills engagement of the ingot being reduced requires an unusually efficient and sturdy bearing construction of which the slipper bearings comprise the principal parts.

The prior art structures generally met the requirements with respect to durability and ability to withstand the attendant conditions but had an unusually high wearing away characteristic necessitating frequent replacement as well as frequent breakage. Replacement of worn or broken slipper bearings necessitates shutting down the blooming mill and the attendant loss of production.

This invention greatly multiplies the life of the slipper bearings and at the same time continues all of its heretofore desirable characteristics.

SUMMARY OF THE INVENTION

A slipper bearing for a coupling in the drive line of a blooming mill comprising a shaped composite metal part having a ferrous metal core and a softer metal wearing surface whereby the life of the slipper bearing is greatly extended.

DESCRIPTION OF THE PREFERRED EMBODIMENT

Figure 1:
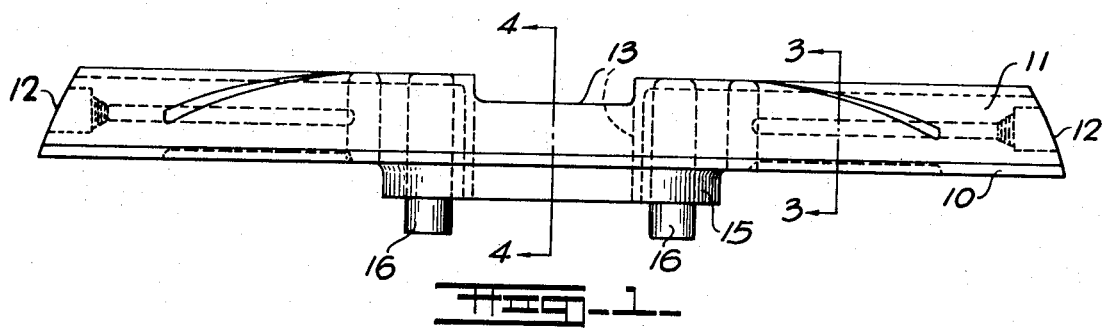
FIG. 1 is a side elevation of a slipper bearing formed in accordance with the invention.
Figure 2:
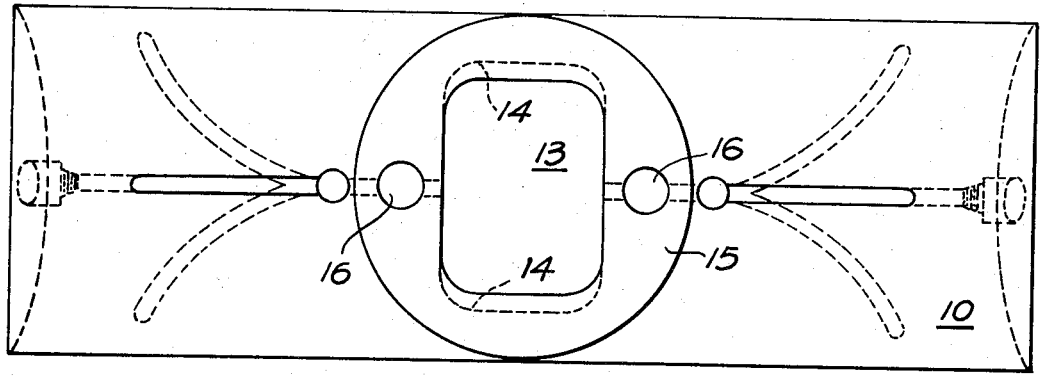
FIG. 2 is a top plan view thereof.

The slipper bearing disclosed herein takes the form and size of slipper bearings heretofore known in the art. It consists of an elongated body member having a flat surface 10 and a transversely arcuate opposite surface 11. The ends of the slipper bearing are angularly formed and indicated by the numeral 12 and centrally of the slipper bearing there is a rectangular opening 13 the sides of which taper as at 14 so that the opening 13 is of a greater width adjacent the arcuate surface 11 of the slipper bearing.

The area of the flat surface 10 surrounding the rectangular opening 13 is in the form of a projecting annular boss 15 with a pair of dowel pins 16 positioned therein and extending outwardly therefrom.

Those skilled in the art will recognize that the dowel pins are provided for registry with openings in a centering ring (not shown), a pair of which are positioned between a pair of the slipper bearings in a universal coupling in the drive line of a blooming mill and which centering rings space a pair of the slipper bearings so that their oppositely disposed outwardly facing arcuate surfaces register in a bore in a portion of the coupling which is movable relative thereto.

Figure 3:
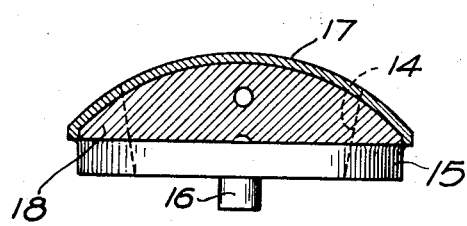
FIG. 3 is a cross section on line 3—3 of FIG. 1.
Figure 4:
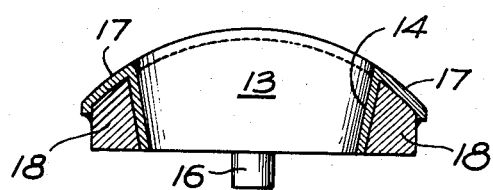
FIG. 4 is a cross section on line 4—4 of FIG. 1.

The arcuate surfaces 11 and the flat surfaces 10 of the slipper bearing are subjected to wear and these surfaces are advantageously formed in accordance with this invention by providing integral wearing surfaces of a soft bronze alloy such as tin bronze or silicon bronze with a Brinell between 80 and 93, as best shown in FIGS. 3 and 4 of the drawings wherein the soft metal surfaces are indicated as being formed of a different alloy 17 while the main body portion of the slipper bearing is formed of a ferrous metal 18, for example cast steel.

In order to form the improved novel slipper bearing disclosed herein a slipper bearing of generally conforming size and shape of cast steel may be provided with built up wearing surfaces by welding tin bronze or silicon bronze or a like soft metal alloy thereto to form a relatively continuous unbroken wearing surface of the softer metal alloy.

The completed slipper bearing bowed through the welding of the coating thereto and may require straightening and may require a post heating treatment in order to insure a desirable end product. The post heating treatment may obviously therefore vary depending upon the composition of the composite slipper bearing.

The composite slipper bearing with its softer metal alloy wearing surfaces and ferrous core has been found to have a useful life many times that of the slippers heretofore known in the art and additionally the soft composite structure has been found to substantially eliminate cracking, breaking and chipping of the metal of the slipper bearing by yieldingly absorbing mechanical shock and eliminating high thermal shock by their self-lubricating action as will occur to those skilled in the art.

It has been determined that slipper bearings formed in accordance with the invention and having the soft metal wearing surfaces as hereinbefore described have an unusually efficient self-lubricating characteristic which is not present in slipper bearings formed of the heretofore commonly used hard metal alloys.

In effect the tin bronze or silicon bronze alloys forming the soft metal wearing surfaces have the ability to utilize the tin and silicon alloy ingredients in the manner of a lubricant while not affecting the actual structure. As a result of this built in lubrication effect, the slipper bearing disclosed herein has an unusually long wearing life thereby meeting the primary object of the invention.

Although but one embodiment of the present invention has been illustrated and described, it will be apparent to those skilled in the art that various changes and modifications may be made therein without departing from the spirit of the invention and having thus disclosed my invention.

What I claim is:

1. A composite metal slipper bearing structure comprising a hard cast steel base member having exterior wearing surface layers of relatively softer metal alloys from the group consisting of tin bronze and silicon bronze, having a Brinell hardness which is between 80 and 93.

2. The bearing of claim 1 wherein the metal alloy consists essentially of about 77 percent copper, about 11 percent tin, about 11 percent lead, and about 1 percent nickel.

3. The bearing of claim 1 wherein the metal alloy consists essentially of about 78 percent copper, about 11 percent tin, and about 11 percent lead.

4. The bearing of claim 1 wherein the wearing surfaces take the form of a continuous unbroken layer of said metal alloys.

* * * * *